United States Patent [19]
Cash et al.

[11] Patent Number: 5,509,138
[45] Date of Patent: Apr. 16, 1996

[54] METHOD FOR DETERMINING SPEEDS OF MEMORY MODULES

[75] Inventors: Christine G. Cash, Cypress; Gary W. Thome, Tomball, both of Tex.

[73] Assignee: Compaq Computer Corporation, Houston, Tex.

[21] Appl. No.: 34,105

[22] Filed: Mar. 22, 1993

[51] Int. Cl.⁶ .............................. G06F 12/06; G06F 12/02
[52] U.S. Cl. ................... 395/497.01; 395/427; 395/821; 395/822; 395/823; 364/970; 364/970.5; 364/DIG. II; 364/245; 364/DIG. I
[58] Field of Search ..................................... 395/650, 700, 395/425, 497.01; 364/970, 245

[56] References Cited

U.S. PATENT DOCUMENTS

| | | | |
|---|---|---|---|
| 4,334,307 | 6/1982 | Bourgeois et al. | 371/16 |
| 4,899,272 | 2/1990 | Fung et al. | 365/230.03 |
| 4,949,298 | 8/1990 | Nakanishi et al. | 364/900 |
| 4,951,248 | 8/1990 | Lynch | 364/900 |
| 4,956,804 | 9/1990 | Matsumoto | 364/900 |
| 4,980,850 | 12/1990 | Morgan | 364/900 |
| 5,012,408 | 4/1991 | Conroy | 364/200 |
| 5,027,313 | 6/1991 | Culley | 364/900 |
| 5,042,003 | 8/1991 | Belt et al. | 364/900 |
| 5,097,437 | 3/1992 | Larson | 395/775 |
| 5,119,486 | 6/1992 | Albonesi | 395/425 |
| 5,253,357 | 10/1993 | Allen et al. | 395/425 |
| 5,272,664 | 12/1993 | Alexander et al. | 365/52 |
| 5,283,877 | 2/1994 | Gastinel et al. | 395/425 |
| 5,287,531 | 2/1994 | Rogers, Jr. et al. | 395/800 |

OTHER PUBLICATIONS

"Topcat High-Performance PC/AT-Compatible Chip Set Data Manual" from VLSI Technology, Inc. Nov. 1989, pp. 4–53, 54, 4–65–76.

Primary Examiner—Kevin A. Kriess
Assistant Examiner—Michael T. Richey
Attorney, Agent, or Firm—Pravel, Hewitt, Kimball & Krieger

[57] ABSTRACT

A microcomputer system with a data destination facility provides for accessing dynamic RAMs of different speeds faster or slower depending on the dynamic RAM speed. When the data destination facility maps the dynamic rams, it also saves a bit indicating whether the block of RAM is a high or low speed RAM. When the memory controller attempts to access a certain location, the data destination facility then returns the value of the speed bit associated with that block of memory to the memory controller state machine, which then omits or adds clock cycles to the memory access depending upon the speed of the memory. Further, in setting up the data destination facility, the system initialization routine determines SIMM sizes by first touching the memory locations at which the SIMMs are occupied to determine if there is memory there, and then determines the SIMM speeds based on a combination of the SIMM sizes and the SIMM identification codes returned through a standard serial shift register.

6 Claims, 10 Drawing Sheets

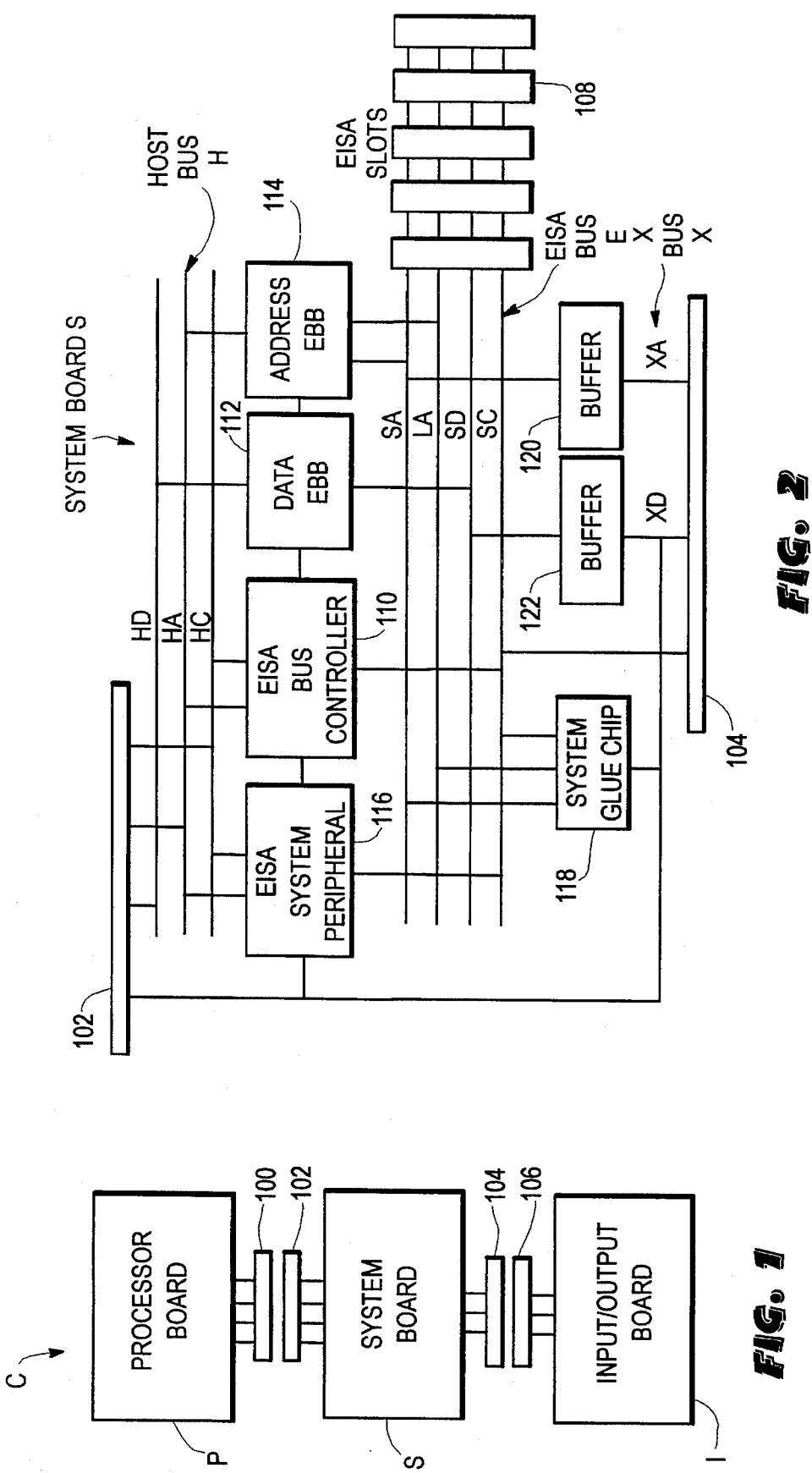

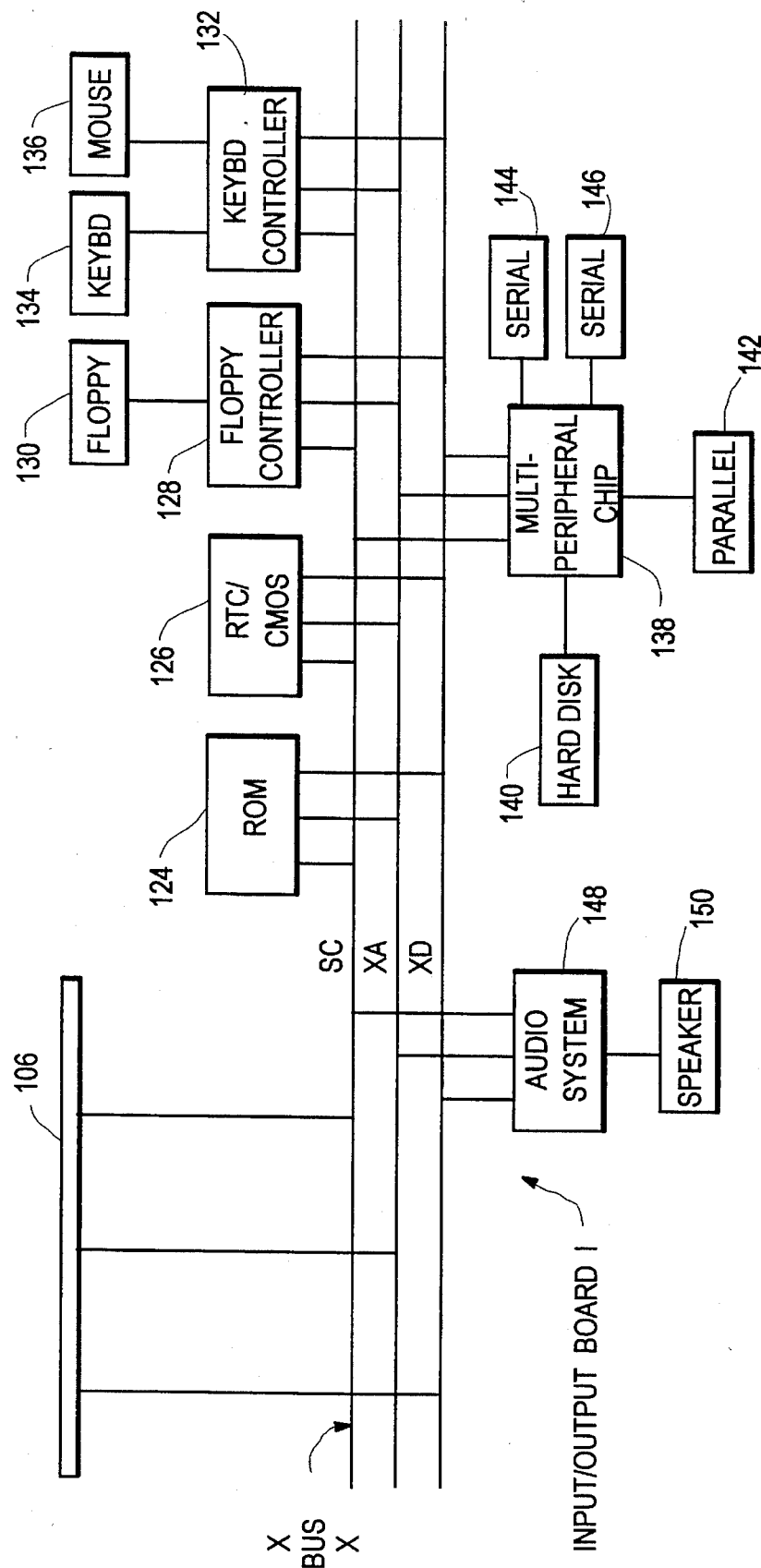

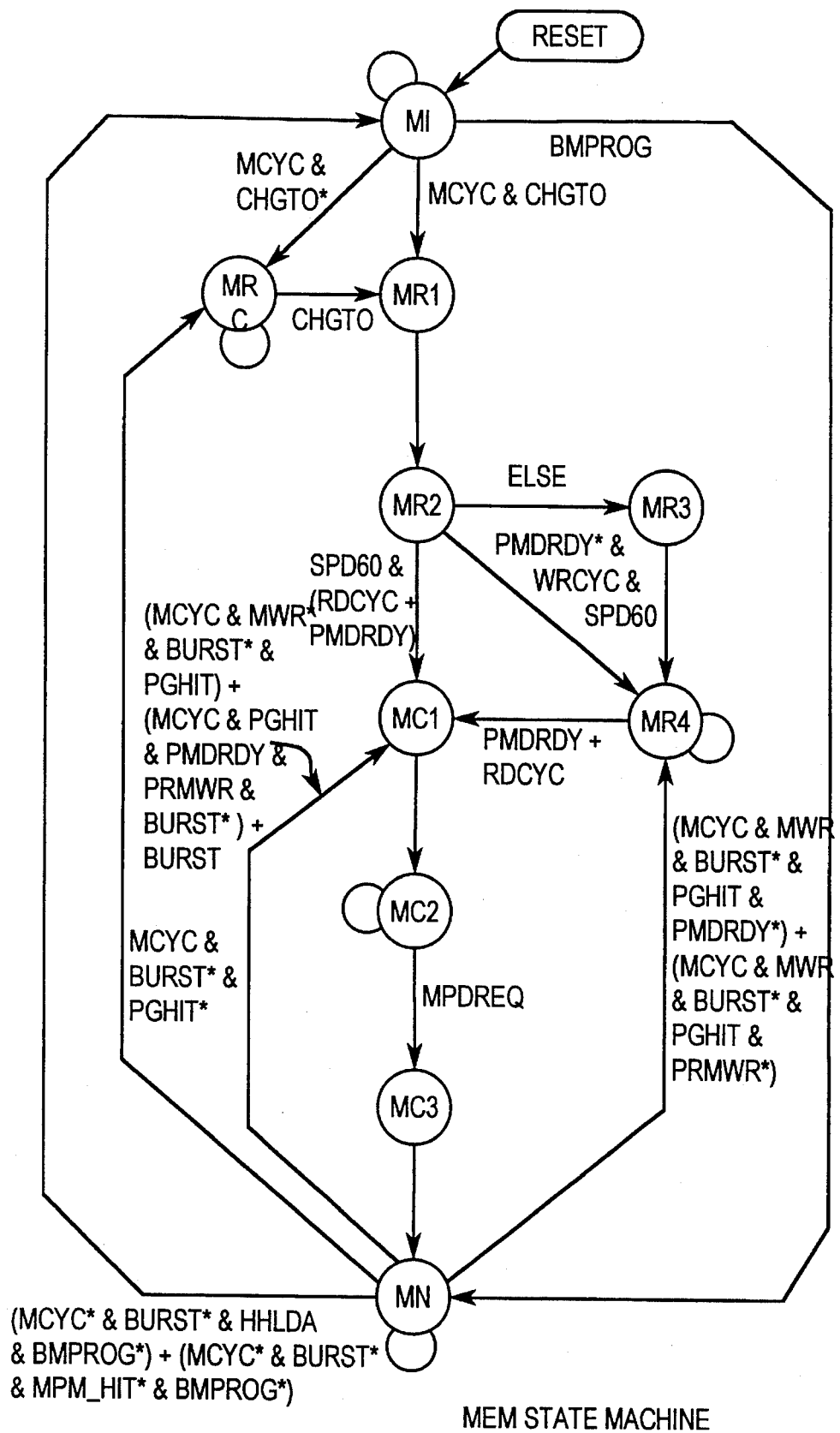
FIG. 9 MEM STATE MACHINE

METHOD FOR DETERMINING SPEEDS OF MEMORY MODULES

BACKGROUND OF THE INVENTION

1. Field of the Invention

The invention relates to memory systems operating with memory devices of varying speeds, and more particularly to determining the particular speeds of the memory devices.

2. Description of the Related Art

Microprocessor-based computer systems have been increasing in performance at a tremendous rate. Much of this increase has been based on the improvements in the microprocessor itself. For example, clock speeds are reaching those previously used only by mainframe computers. However, affordable memory device performance has not been increasing at the same rate. Indeed, dynamic random access memory (DRAM) performance has flattened out recently, with the majority of the effort being concentrated on increasing device storage size. Thus main memory has become a bottleneck.

Cache memory systems, where a small amount of very fast, expensive static RAM is used to store copies of the data, have made the problem somewhat less severe, but the designs are very complicated and expensive. Further, the poor memory performance returns when access must be made to main memory. So there still is a need to improve the performance of the main memory system.

Memory system performance is also a trade off between cost and speed. While conventionally 80 ns DRAMs have been used, 60 ns devices are available, though at a slightly higher cost. While prior memory controllers could utilize differing speeds of DRAMs, allowing the user to make the speed versus cost tradeoff, a mixed speed system did not obtain any benefits. The memory controller could use different speed DRAMs, but only one actual speed of operation was allowed in the system. The memory controller thus ran at the speed of the slowest of the installed DRAMs. This did not allow the user to have fast memory areas, such as the base memory area, and slow memory areas, such as extended memory locations.

One system for mapping memory is described in European Patent Application No. 90 311 749.7, entitled "Data Destination Facility" and published on May 8, 1991, and the counterpart U.S. application, Ser. No. 431,666, filed Nov. 3, 1989, issued on Aug. 23, 1994 as U.S. Pat. No. 5,431,494 which are hereby incorporated by reference. In that system, a data destination facility (DDF) RAM was used for holding address translation, memory module and bank selection, write protect, cacheable status and local memory information. The system upper memory address lines defining 128 kbyte blocks were provided to the DDF RAM as some of the address inputs, with the data being the information. As noted, the system memory address lines only provided a portion of the addressing of the DDF RAM. The upper two bits were provided by two bits previously used to control write protection and remapping and relocation of the BIOS from ROM to RAM. These two bits had previously been located in a specific memory-mapped register. To maintain compatibility with previous software as indicated in the applications, it was thus necessary to set all four possibilities of these two bits and program the DDF RAM for each case. This system, while permitting the remapping of RAM, did not support RAM of differing speeds.

Typically, single in-line memory modules, or SIMMs, are used to provide memory in a modern computer system. These SIMMs provide a four-bit serial identification code to identify both the SIMM size and speed. Reading these identification codes is wellknown in the art, and a technique usable to read the codes is discussed more fully, for example, in U.S. Pat. No. 5,287,531 entitled "Apparatus for System Configuration Determination," issued Feb. 15, 1994, which is hereby incorporated by reference. SIMM size typically ranges from 1 Mb to 64 Mb, with speeds ranging from 100 nanoseconds down to 50 nanoseconds. Unfortunately, there is no standard that is universally accepted to identify these SIMMs. Rather, there are three identification systems that have been used throughout the industry: the "old way," the IBM identification codes, and the JEDEC identification codes. But these identification codes are not the same, and in fact conflict in certain cases. Thus, the identification codes cannot be relied upon to determine memory speed and size, as the SIMMs are otherwise generally interchangeable.

Thus there are memory system performance gains that could be achieved, but conventional design limitations render them only potential, not practical. Therefore it is clearly desirable to have a memory controller which can effectively use different speed memory devices, and to use different speeds, the actual speeds must be determined, and because of the ambiguities discussed above, this cannot be readily done. Thus a way of readily determining SIMM speed is desirable.

SUMMARY OF THE PRESENT INVENTION

A memory controller according to the preferred embodiment utilizes differing speed memory devices, such as 60 ns and 80 ns, on an individual basis, with the memory controller running each memory device at its full designed rate, not the lowest of the rates in the memory system. The speed of the memory is stored for each 128 kbyte block of memory. This stored value is then used when the memory cycle is occurring to redirect a state machine, thus accomplishing a timing change of the memory devices. As this value is available for each 128 kbyte block, each memory device can be operated at its full speed.

To dynamically adjust the system memory timing, however, the memory controller according to the invention must be programmed with the speeds of the individual memory devices. To do this requires determining what the speeds of those devices are, which as previously indicated can be problematic. Although each SIMM contains a four-bit configuration code, which is serially read from each SIMM, those configuration codes are not unique, as there are three different standards used to encode the SIMMs. Thus, in programming the data destination facility (DDF) according to the invention, the processor in its startup code first "feels" each SIMM to determine how many megabytes of memory it contains. Based on this determination, it then determines the SIMM speed as uniquely as possible, given the configuration code for that SIMM and that SIMM's size. The DDF can then be programmed with an extra bit that indicates whether a particular 128 kbyte block is capable of higher speed operation. If this is true, the memory controller then omits a state from its state machine for the operations to the faster memories, providing for faster memory accesses.

Therefore a method according to the present invention allows a memory controller to dynamically adjust its operation for differing speed memory devices by allowing a positive determination of memory speed.

BRIEF DESCRIPTION OF THE DRAWINGS

A better understanding of the present invention can be obtained when the following detailed description of the preferred embodiment is considered in conjunction with the following drawings, in which:

FIG. 1 is a block diagram of a computer system incorporating the present invention;

FIG. 2 is a block diagram of the system board of FIG. 1;

FIG. 3 is a block diagram of the input/output board of FIG. 1;

FIG. 9 is a memory state machine showing how a memory controller would use the output of a data destination facility having an output indicating speed of the SIMMS.

DETAILED DESCRIPTION OF THE PREFERRED EMBODIMENT

Figure 4:
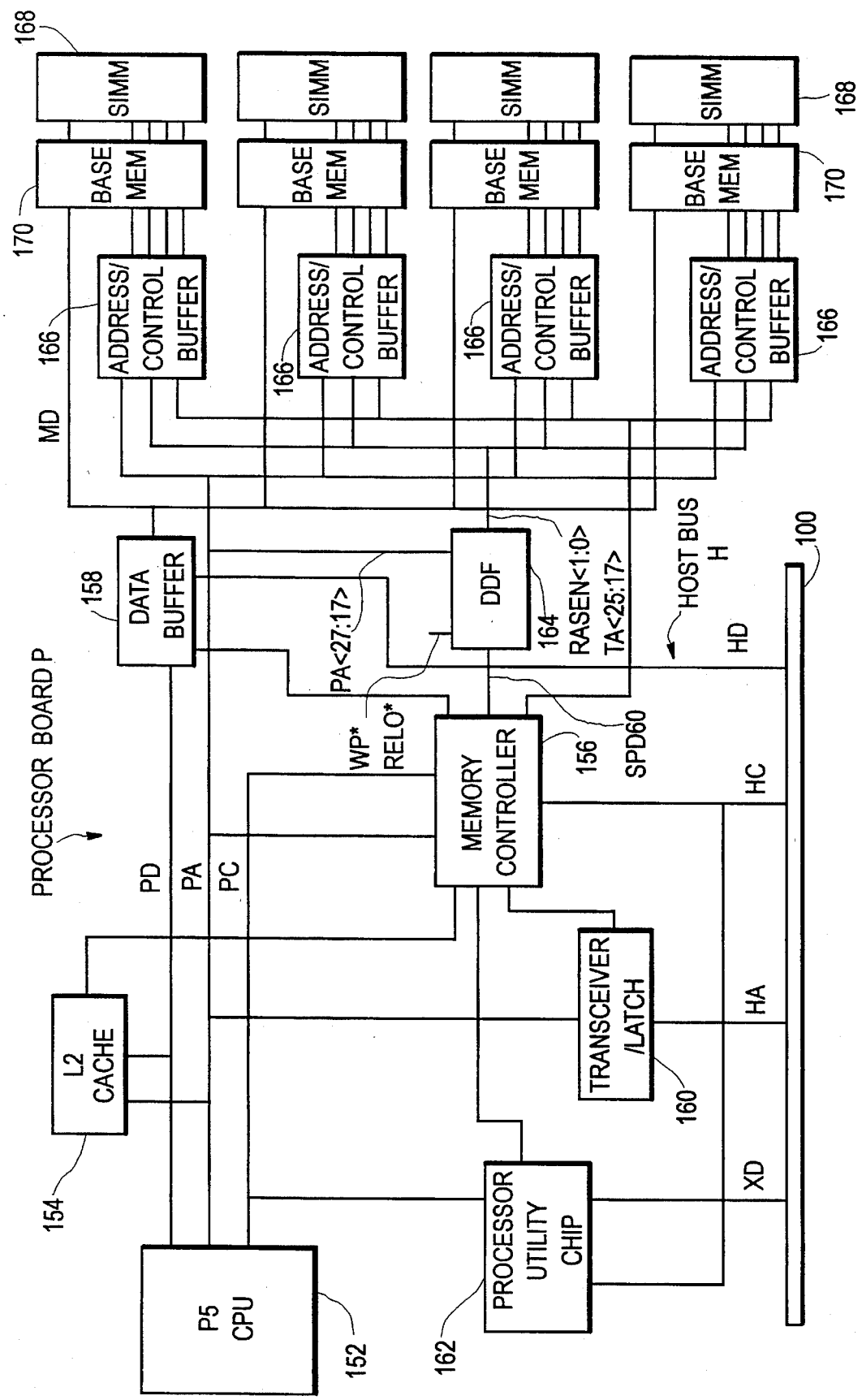
FIG. 4 is a block diagram of the processor board of FIG. 1.

Referring now to FIG. 1, a computer system C according to the preferred embodiment is shown. A processor board P contains the processor, cache memory and main memory and associated equipment and a connector 100, preferably a card edge. A system board S includes a connector 102 to receive the connector 100, preferably a socket to receive a card edge. The system board S contains common system elements and slots or connectors for interchangeable circuit boards. The system board S also contains an additional connector 104. The connector 104 mates with a connector 106 on an input/output (I/O) board I. Preferably the I/O board I contains certain I/O related features of the computer C, such as the floppy and hard disk drive control units, an audio system and the parallel and serial ports. Additionally, the real time clock and CMOS memory is on the I/O board I. Each of the processor board P, system board S and I/O board I are detailed below.

This is noted to be an exemplary and preferred embodiment of the computer system C and it is understood that numerous other embodiments, such as having all of the components on a single system board or mother board as is common, could be readily developed.

Referring now to FIG. 2, a block diagram of the system board S is shown. Two main buses, a host bus H and an EISA bus E, form the logical back bones of the system board S. The host bus H has three components, the host data or HD bus, the HA or host address bus and the HC or host control bus. Preferably the HD bus is 32 bits wide and the HA bus is provided for a 32 bit addressing space. Preferably the host bus H operates substantially according to an 80486 protocol, but including capabilities for pipelining as in the 80386. The EISA bus E has four major components, the SA and LA or system and early address buses, the SD or system data bus and the SC or system control bus. A plurality of EISA slots 108 are connected to the EISA bus E. An EISA bus controller 110 such as the Intel 82358, provides the necessary capabilities to convert between host bus H cycles and EISA bus E cycles and is connected between the HA and HC buses and the SC bus. The EISA bus controller 110 is connected to control a data EBB or EISA bus buffer 112, which provides the necessary data transceiving functions between the host bus H and the EISA bus E and provides the data assembly and disassembly requirements of an EISA system. Similarly, the EISA bus controller 110 provides the control function for an address EISA bus buffer or EBB 114. The address EBB 114 provides transceiving capabilities between the EISA bus E and the host bus H and in addition latches the HA bus signals to form the SA bus signals as appropriate.

The computer C includes certain fundamental components such as an interrupt system, a DMA controller and a number of timers, as well as arbitration of the EISA bus E. These components are all contained in the EISA system peripheral 116, which is connected to the HA, HC and SC buses. A chip referred to as the system glue chip 118 is connected to the EISA bus E and to a bus referred to as the XD or X data bus and performs numerous miscellaneous functions necessary in the computer system C.

Finally, a third bus, referred to as the X bus X, is provided to the connector 104. The X bus X has address XA, data XD and control SC portions. The XA lines are developed from the SA bus by means of a buffer 120, while the XD bus is formed from the SD bus by means of a buffer or transceiver 122. Preferably the XD bus is 16 bits wide, while the XA bus is the same width as the SA bus. The host bus H and the XD bus are provided to the connector 102 for provision to the processor board P. In addition, the XD bus is connected to the EISA system peripheral 116.

Referring now to FIG. 3, the I/O board I is shown in more detail. The backbone of the I/O board I is the X bus X. Connected to the X bus X is a ROM or read only memory 124, which contains the basic operating sequences of the computer system C. The ROM 124 is preferably a flash EPROM to allow ease of changing of the basic operating sequences. A real time clock (RTC)/CMOS unit 126 is connected to the X bus X to provide real time clock functions and longer term memory capabilities. A floppy disk controller 128 is connected to the X bus X and receives a floppy disk unit 130. A keyboard controller 132, typically an 8042 device, is connected to the X bus X and receives a keyboard 134 and a mouse or pointing device 136. A multiple peripheral chip 138 is connected to the X bus X and provides an interface to a hard disk unit 140, a parallel port 142 and two serial ports 144 and 146. Finally, an audio system 148 is connected to the X bus X to provide audio functions, with a speaker 150 connected to the audio system. Other components could be provided on the I/O board I if desired. Preferably, the graphics system in the preferred computer system C is provided on a separate add in card located in an EISA slot 108 and is not necessarily located on the I/O board I.

Referring now to FIG. 4, the processor board P is shown in more detail. The primary component on the processor board P is the processor or CPU 152, in the preferred embodiment preferably the P5 or Pentium microprocessor from Intel Corp., the next generation design after the 80486. In the preferred embodiment the 66 MHz version is utilized. Operation and interfacing of the 80386 and 80486 are assumed to be familiar to the reader. The P5 is a very high performance microprocessor having a superscalar architecture and integrated and separate code and data caches. The data bus is 64 bits wide and 8 parity bits are provided. The data cache is a write-back design having a 64 byte line width. Many of the signals of the P5 have a similar function as in the 80386 and 80486 and only those signals have a changed or new function will be described in detail herein.

One signal is CACHE, which is used to indicate whether the cycle is cacheable by the processor 152. An additional signal used to indicate cacheability is the PCD or page cache disable signal, which is used to disable caching of selected pages of memory. If the CACHE signal is present and the PCD signal is not asserted during a read or write cycle, they are burst cycles, namely cache line fill or write-back. Further, the P5 has only a PBRDY* or processor burst ready input and does not have a PRDY* or single cycle ready input, so the PBRDY, input is used for all ready indications to the processor 152. The P5 does include a PNA* or next address input to allow address pipelining. One additional feature in the P5 is System Management Mode or SMM. This is similar to that in the Intel 80386SL and 80486SL processors. An SMI pin is used to enter SM mode and a signal referred to as SMIACT* is provided to indicate operation in SM mode.

Three buses are connected to the P5 CPU 152, the PD or processor data bus, the PA or processor address bus and the PC or processor control bus. A level two (L2) or external cache 154 is connected to the PD and PA buses and receives control signals from a memory controller 156. In the preferred embodiment the memory controller 156 is a single ASIC which contains the memory controller functions and additionally includes the cache controller capabilities necessary to operate the L2 cache 154.

A data buffer 158 is connected to the PD bus and develops two new buses, the HD or host data bus and the MD or memory data bus. The HD bus is connected to the connector 100 for connection to the system board S. The data buffer 158 is controlled by the memory controller 156. A transceiver/latch unit 160 is connected between the PA bus and the HA bus to provide latching and transceiving capabilities of addresses between the P5 CPU 152 and the host bus H. The transceiver/latch 160 is controlled by the memory controller 156 to allow posting of cycles from the processor bus to the host bus H.

A processor utility chip 160 provides certain necessary utility operations for use with the CPU 152. The processor utility chip 162 is connected to the XD bus and the HC bus and is controlled by the memory controller 156. The output of the processor utility chip 162 is preferably provided to the PC bus to provide control functions of the P5 CPU 152.

The memory controller 156 is also connected to a unit referred to as the DDF or data destination facility 164. The DDF 164 performs memory module enabling, address translation and memory segment or page property storage. The DDF 164 provides memory capabilities to indicate which particular bank of memory is to be enabled, performs address translation on a 128 kbyte boundary and provides indications of certain characteristics of each 128 k block, such as whether it is located in the main memory on the processor board P or is external, write protected, high speed, and/or cacheable and whether that portion can be utilized by a write-back cache. Operation of the DDF 164 is more completely explained in U.S. Pat. No. 5,341,494, which is hereby incorporated by reference and E.P.O. Application 0 426 386, publication date May 8, 1991 which is hereby incorporated by reference by reference. The outputs of the DDF 164 are a series of RASEN or RAS enable signals for enabling a particular memory module, certain translated addresses to indicate the address bits above 128 k, and the page characteristic bits, such as HNCA, HCW, HWP, PLOCMEM*, and SPD60 (which is a bit setting the speed of a particular block to 60 ns or 80 ns).

The memory portion of the processor board P is provided as four identical modules, each module containing an address/control buffer 166, one sockets for receiving an individual SIMM unit 168 and base memory 170. The address/control buffer 166 receives the PA bus, the address and enable outputs of the DDF 164 and control signals from the memory controller 156. The outputs of the address/control buffer 166 are the addresses provided to the SIMMs 168 or base memory devices 170 and the RAS*, CAS* and WE* signals. These signals are provided to each of the SIMMs 168 and the base memory devices 170. Additionally, each SIMM 168 or base memory device 170 is connected to the memory data bus MD. As indicated, there are four like modules. Other configurations of the processor board P could be developed, with variations obvious to one skilled in the art, with certain details provided below.

A further description of the system shown in FIG. 4 can be found in U.S. patent application Ser. No. 08/034,290 entitled "Fully Pipelined and Highly Concurrent Memory Controller", filed concurrently herewith and hereby incorporated by reference.

Certain signals are shown in FIG. 4 related to the DDF 164. The RASEN<1..0> signals from the DDF 164 indicate which bank of memory is to be activated, which will be either the base memory devices 170 or the SIMMs 168. Also associated with the DDF 164 are the signals TA<25:17>, which select memory at a granularity of 128 kbyte blocks, and the processor address bus signals PA<27:17>, which provide the DDF 164 with the high order bits of the address to map. Finally, the WP*, or write protect signal, and the RELO*, or relocatable signal, are also provided to the DDF 164. These are associated with the system BIOS, and are provided for compatibility purposes.

In this embodiment, the base memory devices 170 and the SIMMs 168 are configured to form a 128-bit wide data bus MD. This allows for interleaved reads and writes by the memory controller 156, as the processor 152 uses a 64-bit data bus. This further means that when one of the SIMMs 168 is addressed, all four are addressed, as the SIMMs 168 are each 36 bits wide, or 32 bits plus 4 parity bits, and all four are needed to form a 128 bit data bus MD.

The DDF 116 provides the memory speed signal SPD60 to the memory controller 156. This signal, when true, instructs the memory controller 156 to omit one or two cycles from its memory state machine, thus increasing speed when accessing faster memory.

The DDF 164 provides for improved remapping and module location flexibility without the generation of great circuit complexity. The memory is organized into 128 kbyte blocks. For each 128 kbyte block, a row address strobe enable code, the necessary address lines to place the 128 kbyte block within a module's address space, the write protect status, the write back enabled indication, the local or external location of the memory, and the memory speed are specified. This information is contained in a data destination facility (DDF) RAM to allow the characteristics for each 128 kbyte block to be easily changed for each individual computer system. This allows modules to be sized and located as desired, allows remapping around bad areas and allows BIOS ROM remapping and write protection using the same mechanism. The functioning of the DDF 164 is more fully explained in the referenced patent application; its operation remains essentially the same. To implement the variable memory speed functions of the invention, an additional memory speed bit has been added to the DDF 116 RAM.

The data is written to or read from the DDF RAM by setting a programming bit and performing a memory write operation. If a write operation is to occur, the desired value is placed in an I/O register before the memory write operation occurs. If a read operation is desired, the I/O register is read after the memory write operation has occurred. The state of a particular address bit indicates whether the operation is a read from or a write to the DDF RAM. When the programming bit is set, the memory write operation is disabled to the actual memory devices so that no erroneous data is written to the memory devices and instead causes a read or write to the DDF RAM.

In the preferred embodiment, several types of SIMMs can be used to populate the SIMMs 168. Further, the base memory devices 170 consist of either 8 megabytes of memory or 16 megabytes of memory. These are accessed using the previously described RASEN*<1..0>, which select banks 0 through 3, and which are populated according to the table that follows:

| Total Memory RASEN <1..0> | Bank 0 <11> | Bank 1 <10> | Bank 2 <01> | Bank 3 <00> |
|---|---|---|---|---|
| 16MB | 8MB base | 8MB base | — | — |
| 20MB | 8MB base | 8MB base | 4MB (4 × 1MB) | — |
| 24MB | 8MB base | 8MB base | 4MB ½(4 × 2MB) | 4MB ½(4 × 2MB) |
| 32MB | 8MB base | 8MB base | 16MB (4 × 4MB) | — |
| 48MB | 8MB base | 8MB base | 16MB ½(4 × 8MB) | 16MB ½(4 × 8MB) |
| 80MB | 8MB base | 8MB base | 64MB (4 × 16MB) | — |
| 144MB | 8MB base | 8MB base | 64MB ½(4 × 32MB) | 64MB ½(4 × 32MB) |

As seen in the above table, the base memory devices 170 occupy bank 0 and, optionally, bank 1; the SIMM memory 168 occupies bank 2 and, optionally, bank 3. Some SIMMs only occupy one bank, bank 2, whereas other SIMMs occupy both banks 2 and 3. Again, the SIMMs used to populate the SIMMs 168 do not support memory size configuration bits in a consistent manner, and the startup software must therefore feel for memory size directly.

Figure 5:
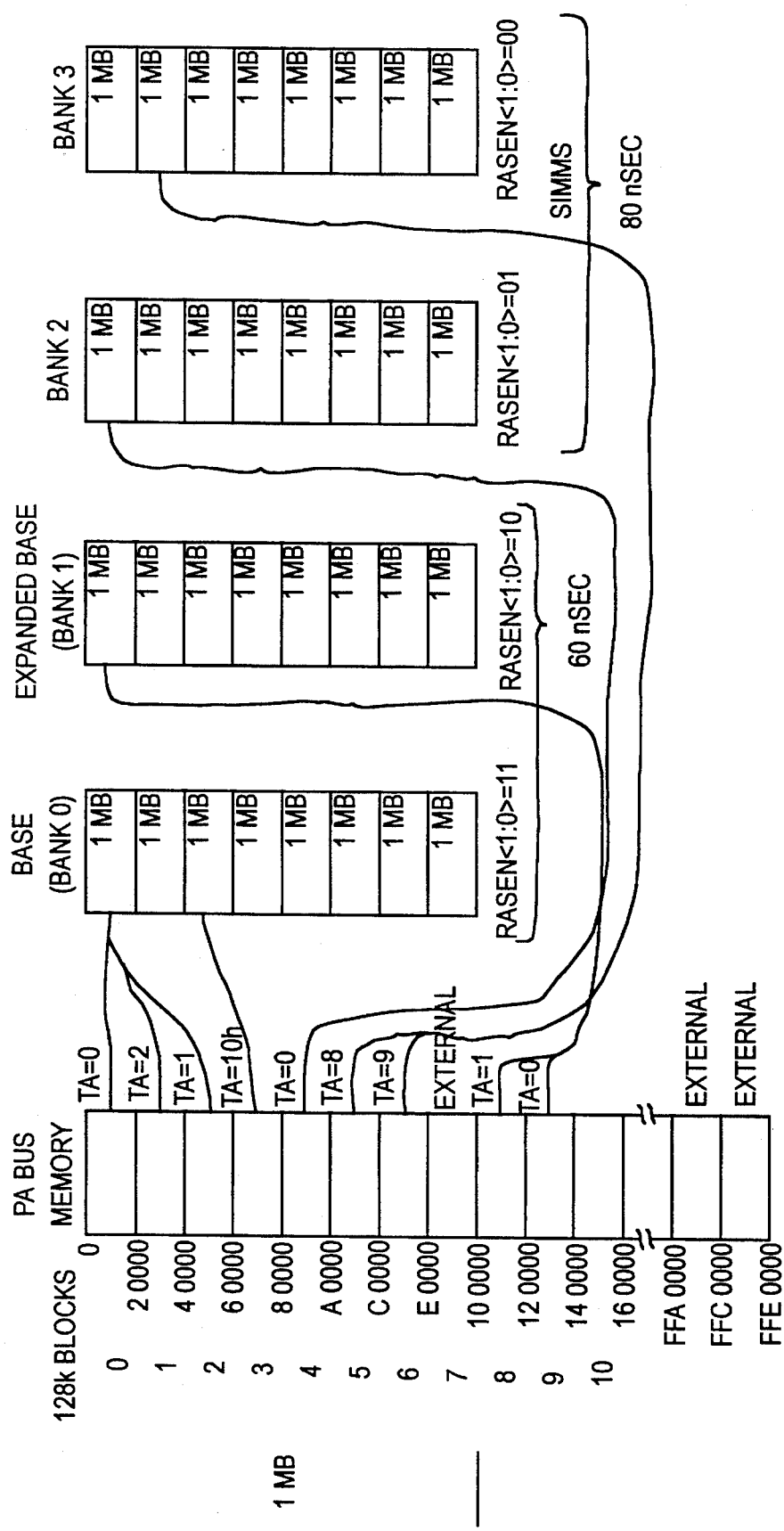
FIG. 5 is a representation of the logical to physical relationship of memory banks in a system according to the invention.

FIG. 5 shows a representative mapping of the address which is to appear on the address lines PA with the appropriate desired map of the TA values and the RASEN values. In this description, address and RASEN values are referenced in hexadecimal notation, while bit locations in a bus and memory sizes are referred to in decimal notation. For example, the first 128 kbyte block from address 0 to 20000 is remapped to have a TA value equal to 0 and a RASEN value equal to 3, so that it is mapped into the first 128 kbyte block of the RASEN 3 bank (bank 0) of the first 1 Mbyte of base memory devices 170. The next 128 kbyte block of memory from 20000 to 40000 is mapped to the TA value equal to 2 and a RASEN value equal to 3 so that the third 128 kbyte block of the first 1 Mbyte of base memory devices 170 is addressed. The third 128 kbyte memory space from address 40000 to 60000 is mapped so that a TA value of 1 is present and a RASEN value of 3 is present so that the second 128 kbyte block of the base memory devices 170 is accessed for this memory range. Thus, it can be seen that the blocks in the bank in the memory need not be taken in order but can be taken out of order as desired. The fourth 128 kbyte block of memory from address 60000 to 80000 receives a TA value of 10 and a RASEN value of 3.

In the Figure, the next 128 kbyte block of memory from address 80000 to A0000 receives a TA value of 0 but a RASEN value of 1 so that the first 128 kbyte block in bank 2 of the SIMMs 168 is accessed for this particular memory value block. For the memory block from address A0000 to C0000 a TA value of 8 is applied as well as a RASEN value of 0, so that the ninth 128 kbyte block of bank 3 of memory is utilized. It has been noted that a block of a bank can be skipped, for example, because it is bad, thus not requiring the entire 1 Mbyte module to be replaced if a particular 128 kbyte block is unusable. The memory address block from address C0000 to E0000 receives a TA value equal to 9 and a RASEN value equal to 0 so that the tenth 128 kbyte block of bank 0, containing the base memory devices 170, is accessed. The 128 kbyte memory block from address E0000 to 100000 is classified to be external by having the HLO-CMEM* signal high, so that no values need to be programmed to the TA or RASEN bits because they will not be utilized in this operation. This address range is then handled by external memory, such as that present on boards located in the EISA slots. As can be seen, this process continues as shown in FIG. 10 so that various forms of remapping are possible as desired, so that particular blocks can easily be programmed around and the modules need not be located in a sequential order having memory sizes in particular order. Further, it can be seen in this embodiment that the 8 or 16 Mbytes of the base memory devices 170 are all 60 ns RAM, while the SIMMs 168 are 80 ns.

Again, the physical SIMMs that occupy banks 2 and 3 of FIG. 5 correspond to the SIMMs 168 shown in FIG. 4. In this embodiment, only four SIMMs are installed, but they must all be the same size, as each provides 32 bits of the entire 128-bit data path MD. Thus, although the SIMMs occupy two banks, as shown in FIG. 5, the SIMMs will either occupy both banks 2 and 3, or only bank 2. That is, one SIMM will not occupy bank 2 and the other bank 3.

Figure 6A:
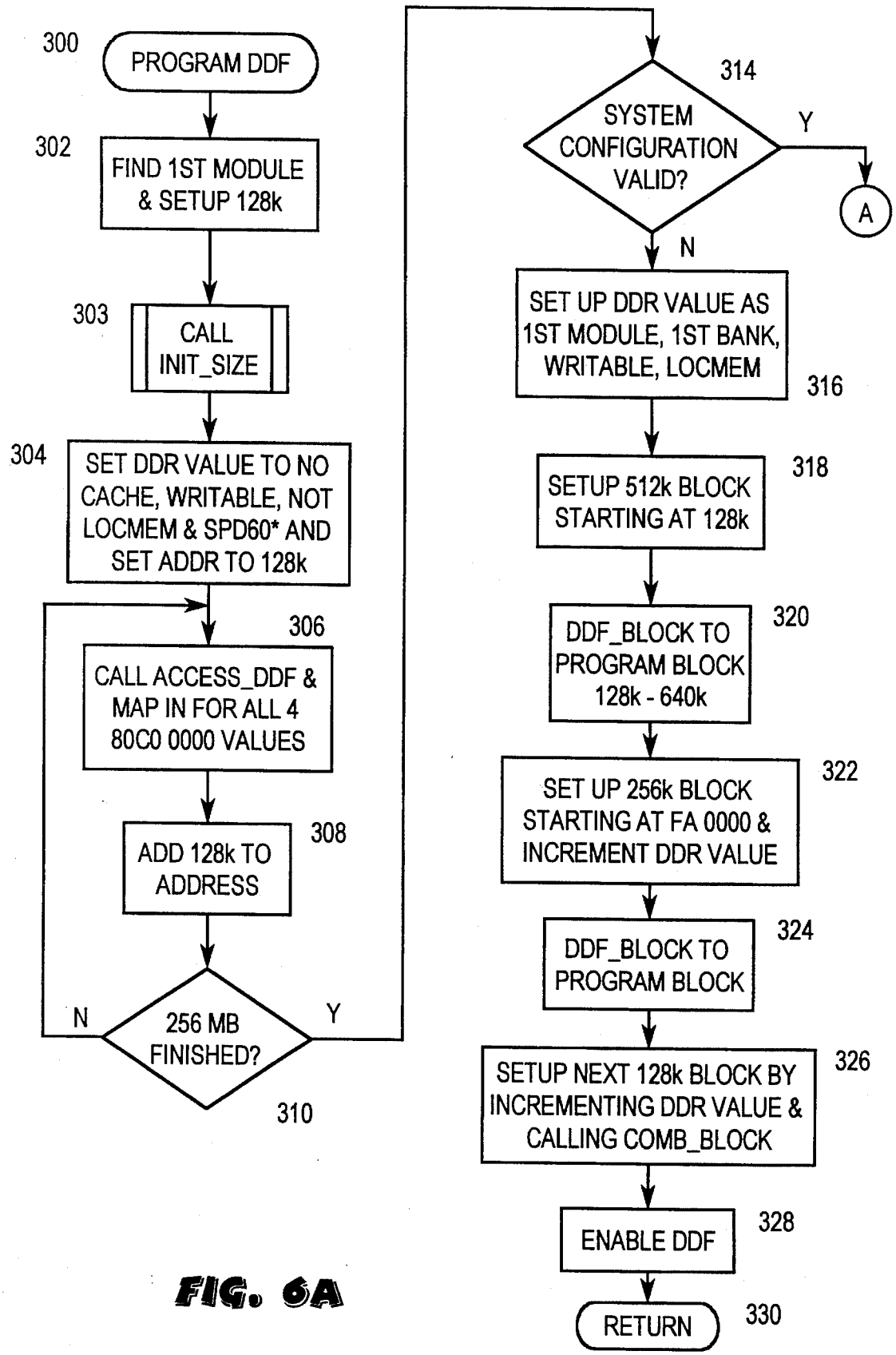
FIGS. 6A–6C are flow chart illustrations of the operation of software according to the invention.

Because the DDF 164 data is contained in a RAM, it is necessary to program the RAM after powerup or reset of the system. It is also desirable that the RAM be programmable during other periods to allow users to vary their system design. A sequence suitable to be used during the power on self-testing (POST) portion in the initialization of the computer system C is the PROGRAM DDF sequence 300 shown in FIG. 6A. The PROGRAM DDF sequence 300 commences at step 302 where the first bank of the first memory module, in this case the base memory 170, is set up to be local memory and writable for the first 128 kbyte block. This operation thus sets up a minimum amount of RAM for utilization during the initialization sequences. Control then proceeds to step 303, where a subroutine called INIT_SIZE is called. This subroutine will be described in further detail in the discussion of FIG. 7, but in summary, it returns the sizes and speeds of the various SIMMs 168 installed as memory. This routine must first determine the size of the SIMMs 168 installed in the sockets, and then determine, based on their configuration bits, their associated speeds. Further, this routine determines if there is a size and speed match and responds accordingly with an error if so.

In step 304, the data destination register (DDR) value which is stored in the computer C is set to noncacheable, writable, external memory mode, and slow memory devices, and an address pointer is set to point to the beginning of the second 128 kbyte block. Control proceeds from step 304 to step 306, where a subroutine called ACCESS_DDF is called which performs the actual programming of the DDF values to the address indicated by the address pointer.

In step 306, this operation is performed for all four of the 80C00000 values of interest. This special memory location, described in the referenced patent application, relates to moving the BIOS ROM to RAM and then write protecting that RAM. For this initial definition, the memory is all assumed to be slow. This is done from the results of the INIT SIZE routine called at step 303, which also returns the speeds of the various banks. Thus, when this bank of memory is mapped, it is set to its physical speed. Control then proceeds to step 308, where 128 kbytes is added to the address pointer to address the next address block. In step 310, a determination is made as to whether 256 Mbytes, the limit of the DDF facility in the preferred embodiment, has been programmed to this default value. If not, control returns to step 306 and the default programming continues. If all of the 256 Mbytes have been completed so that the DDF RAM is loaded with default values, effectively disabling the main memory except for the first 128 kbyte block, then control proceeds to step 314, where a determination is made to see if the system configuration information, which is contained in CMOS memory, is valid. The system configuration information contains information such as where bad memory blocks are located, how much memory is actually installed in the system, logical address ranges of the memory and various characteristics of the memory.

If the configuration information is not valid, a default memory configuration must be programmed, so control proceeds to step 316 where a data destination register (DDR) value which addresses the first bank in the first module the first bank and the memory is slow, writable and local is developed. In step 318, the address pointer is moved to point to the second 128 kbyte block with an ending address pointer set up sot hat an additional 512 kbytes of memory is programmed with the desired preset DDF values, resulting in 640 kbytes base memory available to the user. The programming operation is performed in step 302 by a call to a DDF_BLOCK sequence which programs in values for all four possible values of bits zero and one of 80C00000. In step 322, the 256 kbyte block starting at address FA00000 is developed and the DDR value is incremented so that this memory space is available for the user. The appropriate DDR value is programmed in using the DDF_BLOCK sequence in step 324. Finally, in step 326, a final 128 kbyte block is developed by incrementing the DDR value and calling a COMB_BLOCK routine which programs a single 128 kbyte block to be used for the RAM copy of the ROM. Thus, 640 kbytes of base memory and 384 kbytes of system memory has been programmed. Control proceeds to step 328 where the DDF enable bit is set, thus activating the DDF section. Control proceeds to step 330 which is a return to the calling routine.

Figure 6B:
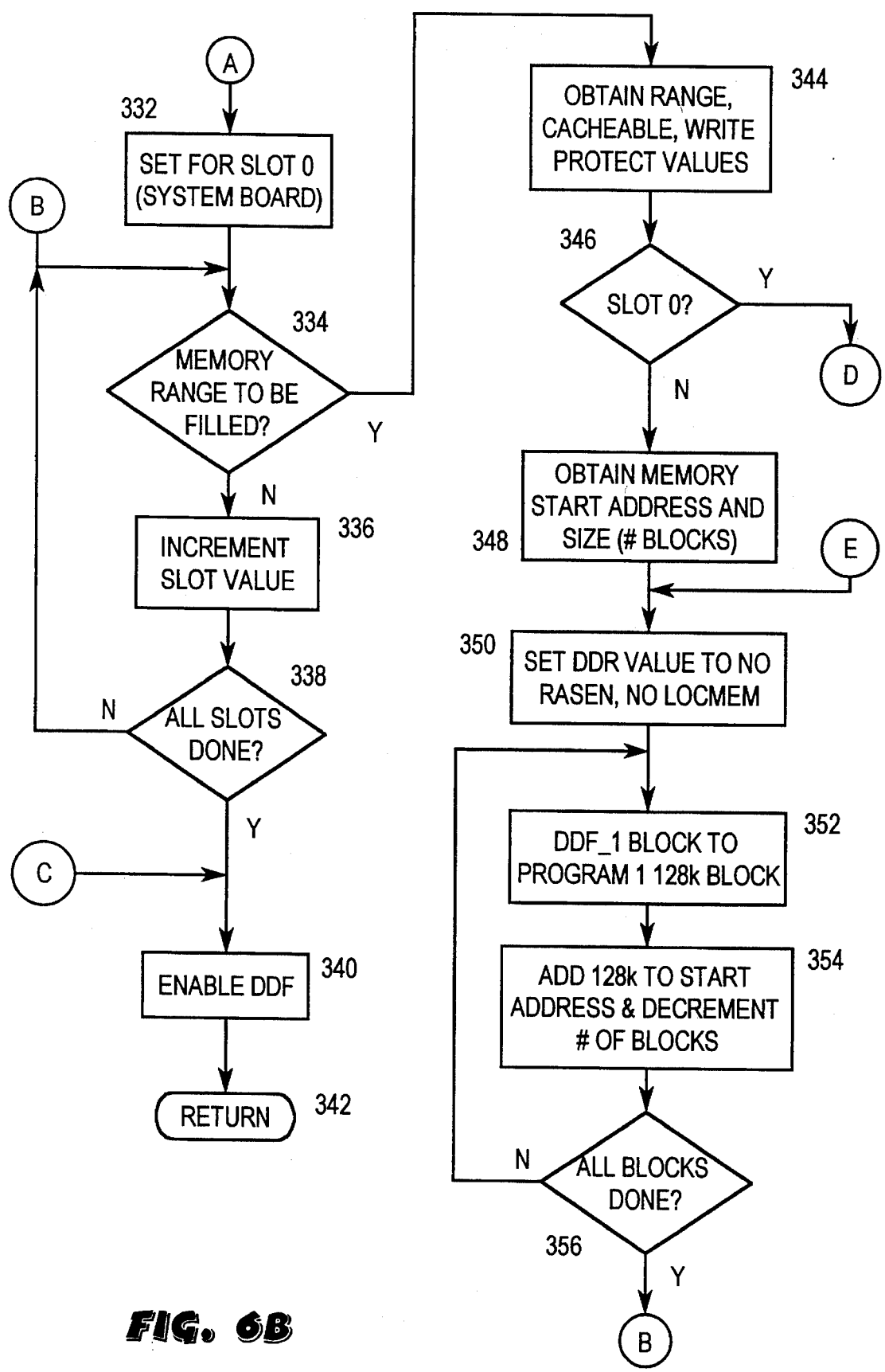

If, in step 314, it was determined that the system configuration information was valid, control proceeds to step 332 in FIG. 6B where a pointer is set to indicate slot 0, which is the system board in the preferred embodiment. This slot counter is to be utilized in checking through the various information stored in the system configuration information to find information relating to the RAM that is present in the system. Control proceeds to step 334 where a determination is made if there is a memory range to be filled in that particular slot. If not, control proceeds to step 336 where the slot value is incremented to proceed to the next possible slot. In step 338, a determination is made if all of the slots have been evaluated. If not, control returns to step 334. If all of the slots have been evaluated, then control proceeds to step 340, where the DDFEN bit is set, thus enabling the DDF function. Control proceeds to step 342 for a return to the calling sequence.

If, in step 334, it was determined that there was a memory range to be filled, control proceeds to step 344 where the sequence determines the memory range, the cacheable status, and the write protect values for that particular range. In step 346, a determination is made as to whether slot 0 is the active slot. This is necessary because all non-slot 0 memory is considered to be external memory. If slot 0 is not being analyzed, control proceeds to step 348 where the memory starting address and number of 128 kbyte blocks in the particular memory range is determined. Control proceeds to step 350 where the DDR value is set to indicate that there is no local memory and no RASEN* signals are to be made low. Control proceeds to step 52 where a DDF_1BLOCK sequence is called to program a single 128 kbyte block into the DDF RAM 126. Control proceeds to step 354 where a 128 k value is added to the starting address and the number of blocks is decremented. In step 356, a determination is made as to whether all blocks have been programmed. If not, control returns to step 352 for programming the next block. If so, control proceeds to step 334 to find the next memory range for that particular slot.

Figure 6C:
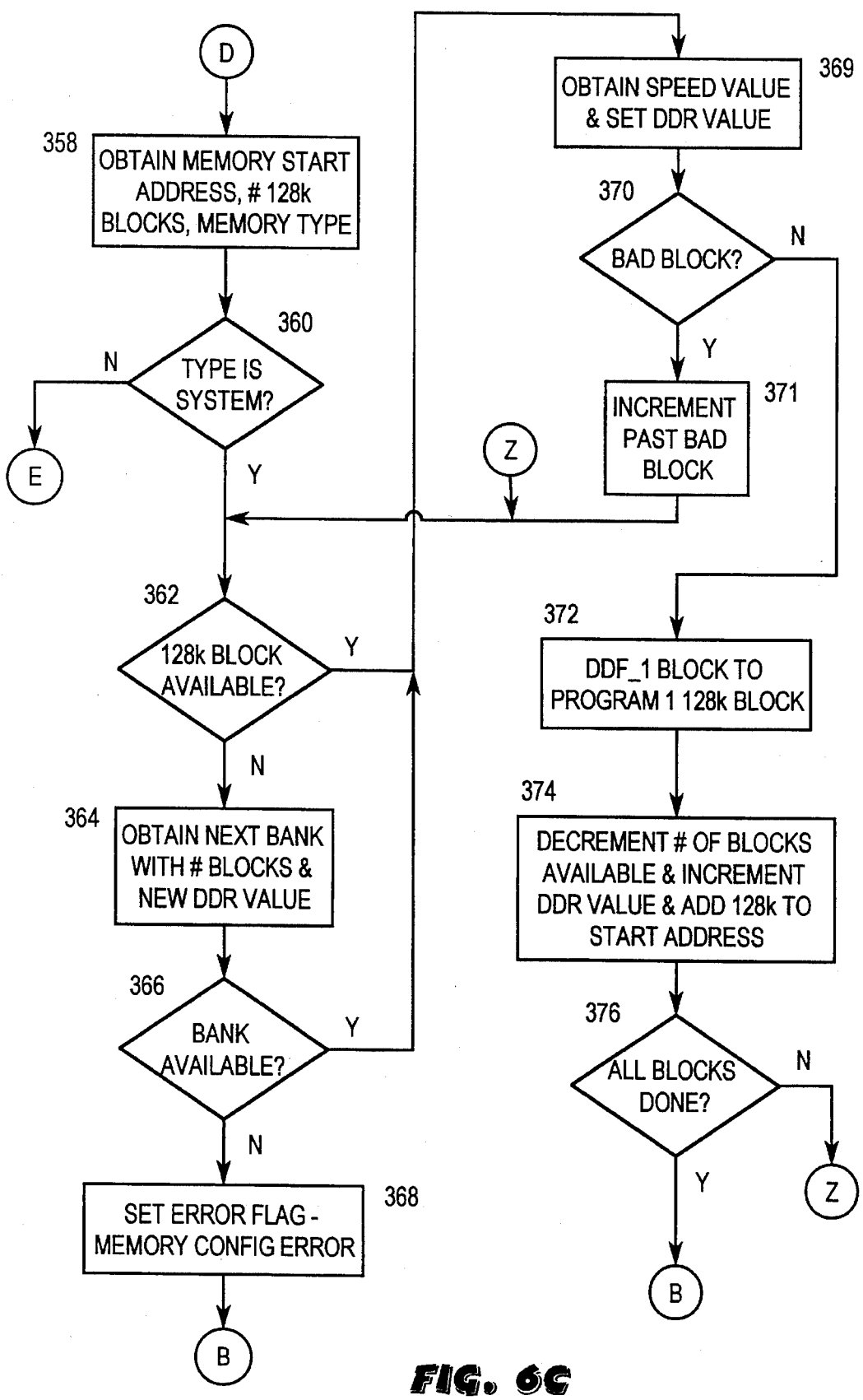

If, in step 346, it was determined that slot 0 was being programmed, then control proceeds to step 358 in FIG. 6C where the memory starting address and the number of 128 kbyte blocks and the memory type is obtained. In step 360, a determination is made if the memory type is system memory. If not, control proceeds to step 350 because non-system memory located on the system board or main memory board is not considered to be local memory. If the memory type is system memory, control proceeds to step 362 where it is determined if a 128 kbyte block is available for programming. If not, control proceeds to step 364 where the next bank of memory is obtained, with the number of blocks available, and a new base DDR value is written to address the new bank. Control then proceeds to state 366 to see if a bank is available. If a bank is not available, control proceeds to step 368 where an error flag is set which indicates that there has been a memory configuration error. Control then proceeds to step 334.

If there were blocks available at step 362, or a bank was available at step 366, control proceeds to step 369, where the speed value for the particular bank of memory, either base memory 170 or SIMM 168, is obtained and incorporated into the DDR value. Control then proceeds to step 370 where a determination is made by checking the configuration information as to if this is a bad block of memory by calling a MAP_OUT_BLK sequence. If so, control proceeds to step 371 where the DDR value is incremented past the bad block. Control then returns to step 362 to see if another block is available. If it is not a bad block, control proceeds to step 372 where the DDF_IBLOCK sequence is called to program one 128 k block with the DDR value that has been set at the starting memory address which has been programmed. In step 374, the number of blocks available is decremented, the DDR value is incremented, and 128 k is added to the starting address. Control then proceeds to step 376 where a determination is made as to whether all of the blocks have been programmed. If not, control returns to step 362. If so, control proceeds to step 334 to see if any more memory ranges are to be filled.

The subroutines references in this POST routine are further described in the previously referenced patent.

Figure 7:
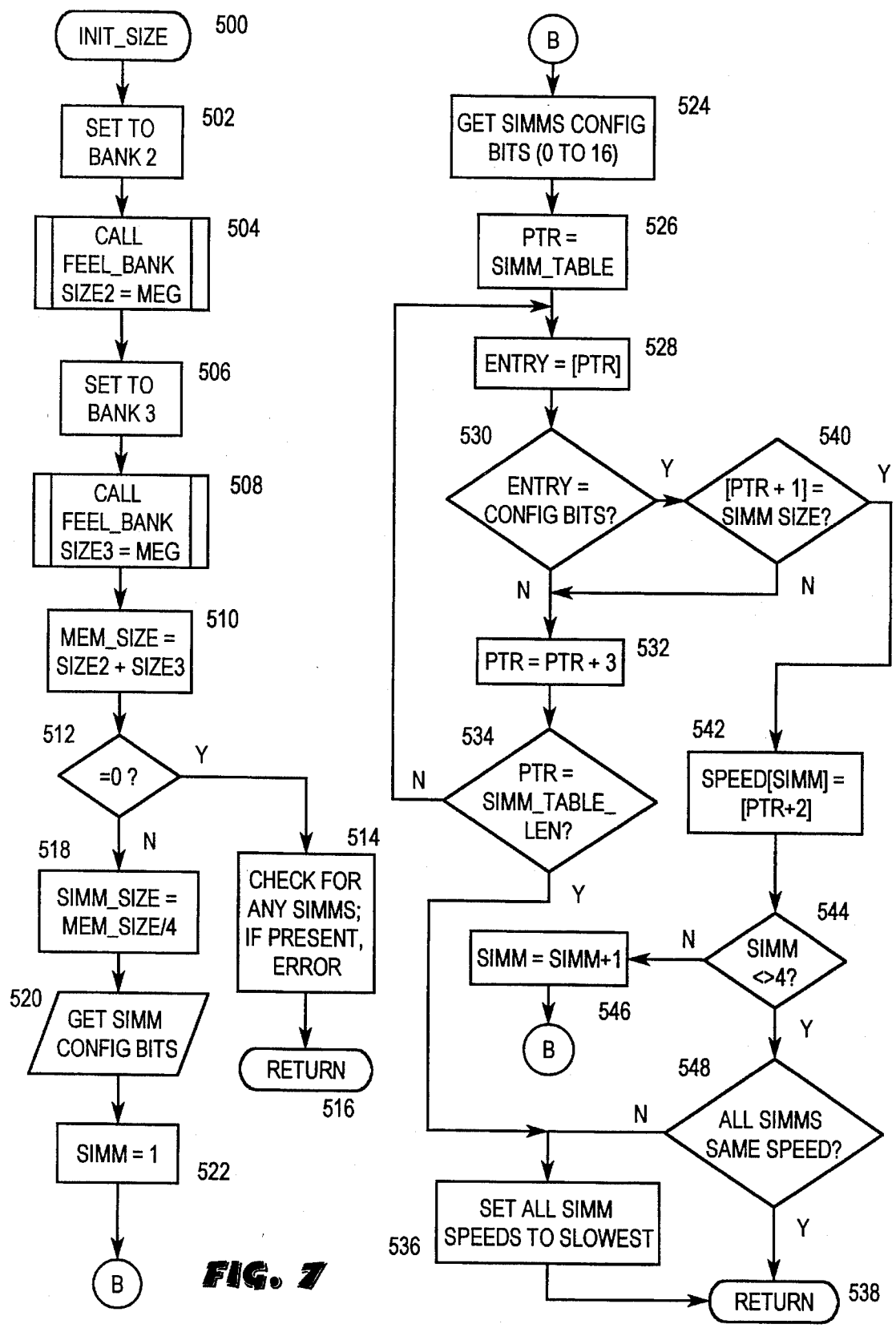
FIG. 7 is a flow chart illustration of a routine for determining the speeds of SIMMs in a computer system according to the invention.

FIG. 7 shows the INIT_SIZE routine 500. This routine is used to determine the size of the SIMMs 168 and their associated speeds. It does this by first determining the size through "feeling" for memory, and then, based on the size and the configuration bits, determining the associated SIMM speed. The speed of the base memory 170 is simply determined as it is preferably soldered down by the system manufacturer, so that the speed bit in its configuration information is thus unambiguous and is used directly to determine the speed.

The routine begins at step 502, where it sets the DDF 164 to enable bank 2. It does this by causing the DDF 164 to set its appropriate RASEN outputs.

Proceeding to step 504, the routine calls the FEEL_BANK routine 600, which returns the size in megabytes of the SIMMs located in bank 2. This is stored by loading SIZE2 with the value of MEG. Proceeding to step 506, the routine instructs the DDF 164 to access bank 3, which is also a SIMM 168 bank, and at step 508, the routine again calls FEEL_BANK 600, and loads SIZE3 with the value of MEG, thus saving the size of the SIMMs in bank 3.

At step 510, MEM_SIZE is loaded with the sum of SIZE2 and SIZE3. Thus, MEM_SIZE contains the total amount of memory in megabytes available in the SIMMs 168. If, at step 512, MEM_SIZE is determined to be zero, then the routine proceeds to step 514, where it checks to see if there are any SIMMs 168 present. If there are, then an error has occurred, as there should not be a MEM_SIZE of zero. In either case, at step 516, the routine returns either with a MEM_SIZE value of zero or with an error indicating too few SIMMs.

If MEM_SIZE did not equal zero at step 512, the routine proceeds to step 518, where SIMM_SIZE is set to MEM_SIZE divided by 4. This is appropriate, as in this embodiment, four SIMMs of the same size are to be used, each SIMM being a 36-bit SIMM making up the 128-bit data path MD plus parity.

Proceeding to step 520, the routine retrieves the SIMM configuration bits through a serial shift register, as described in the previously referenced application. Briefly, the various configuration bits in the computer system are provided to the parallel inputs of a shift register chain, which chain is loaded upon reset or command. Thereafter, each time a byte is read from a designated port, the chain is shifted by one byte, so that the next access to the port provides the next series of configuration entries. In this manner, the configuration bits are obtained. Then, at step 522, a variable SIMM_CNT is set to 1, indicating that the routine is to determine the speed of the first SIMM of the four. Proceeding to step 524, the configuration bits of the first SIMM are separated out of the serial streams retrieved at step 520. Moving to step 526, the routine loads a pointer PTR with the starting address of SIMM_TABLE, which is a table enumerating SIMM configuration bit patterns, SIMM sizes in megabytes, and SIMM speeds of either 60 or 80 nanoseconds. This table is produced below.

Table of SIMM configuration bits indicating SIMM size and speed.
If the configuration bits are the same for more than 1 SIMM then the slowest speed for that SIMM is stored in the table.

| 0000 | 4MB  | 80ns      | 1000 | 32MB | 50ns       |
| 0001 | 4MB  | 70ns      | 1001 | 2MB  | 70ns, 80ns |
|      | 8MB  | 80ns      |      | 32MB | 70ns       |
|      | 16MB | 70ns      |      |      |            |
| 0010 | 4MB  | 70ns, 80ns| 1010 | 2MB  | 80ns, 85ns |
|      | 16MB | 80ns      |      | 32MB | 80ns       |
| 0011 | 2MB  | 70ns      | 1011 | 2MB  | 60ns       |
|      | 4MB  | 60ns      |      | 8MB  | 60ns       |
|      | 16MB | 60ns      |      | 32MB | 60ns       |
| 0100 | 16MB | 50ns      | 1100 | 1MB  | 70ns       |
| 0101 | 1MB  | 60ns, 70ns| 1101 | 8MB  | 70ns       |
|      | 16MB | 70ns      |      | 32MB | 70ns       |
| 0110 | 1MB  | 80ns, 85ns| 1110 | 2MB  | 60ns       |
|      | 16MB | 80ns      |      | 8MB  | 80ns       |
|      |      |           |      | 32MB | 80ns       |
| 0111 | 1MB  | 60ns      | 1111 | 8MB  | 60ns       |
|      | 4MB  | 60ns      |      | 32MB | 60ns       |
|      | 16MB | 60ns      |      |      |            |

If more than 1 SIMM is identified by the same configuration bits and running at different speeds, then the table identifies the SIMM at the slower speed.
e.g. 0101 = 1MB 60ns, 70ns
In the table 0101 = 1MB 70ns
NOTE:   60ns represented as 0.
        80ns represented as 1.

```
simm_table
    db 0,4,1      ; 0 ==> 4MB, 80ns
    db 1,4,1      ; 1 ==> 4MB, 80ns
    db 1,8,1      ; 1 ==> 8MB, 80ns
    db 1,16,1     ; 1 ==> 16MB, 80ns
    db 2,4,1      ; 2 ==> 4MB, 80ns
    db 2,16,1     ; 2 ==> 16MB, 80ns
    db 3,2,1      ; 3 ==> 2MB, 80ns
    db 3,4,0      ; 3 ==> 4MB, 60ns
    db 3,16,0     ; 3 ==> 16MB, 60ns
    db 4,16,0     ; 4 ==> 16MB, 60ns
    db 5,1,1      ; 5 ==> 1MB, 80ns
    db 5,16,1     ; 5 ==> 16MB, 80ns
    db 6,1,1      ; 6 ==> 1MB, 80ns
    db 7,1,0      ; 7 ==> 1MB, 60ns
    db 7,4,0      ; 7 ==> 4MB, 60ns
    db 8,32,0     ; 8 ==> 32MB, 60ns
    db 9,2,1      ; 9 ==> 2MB, 80ns
    db 9,32,1     ; 9 ==> 32MB, 80ns
    db 10,2,1     ; 10 ==> 2MB, 80ns
    db 10,32,1    ; 10 ==> 32MB, 80ns
    db 11,2,0     ; 11 ==> 2MB, 60ns
    db 11,8,0     ; 11 ==> 8MB, 60ns
    db 11,32,0    ; 11 ==> 32MB, 60ns
    db 12,1,1     ; 12 ==> 1MB, 80ns
    db 13,8,1     ; 13 ==> 8MB, 80ns
    db 13,32,1    ; 13 ==> 32MB, 80ns
    db 14,2,0     ; 14 ==> 2MB, 60ns
    db 14,8,1     ; 14 ==> 8MB, 80ns
    db 14,32,1    ; 14 ==> 32MB, 80ns
    db 15,8,0     ; 15 ==> 8MB, 60ns
    db 15,32,0    ; 15 ==> 32MB, 60ns
```

Table of SIMM configuration bits indicating SIMM size and speed. If the configuration bits are the same for more than 1 SIMM then the slowest speed for that SIMM is stored in the table. (continued)

| 0110 | 1MB  | 80ns, 85ns | 1110 | 2MB  | 60ns |
|      | 16MB | 80ns       |      | 8MB  | 80ns |
|      |      |            |      | 32MB | 80ns |
| 0111 | 1MB  | 60ns       | 1111 | 8MB  | 60ns |
|      | 4MB  | 60ns       |      | 32MB | 60ns |
|      | 16MB | 60ns       |      |      |      |

Of particular interest are configuration codes 0101 and 1110, where different speed SIMMs are defined, even though the configuration code is the same.

At step 528, ENTRY is loaded with the value pointed to by PTR. This will be a configuration bit value in SIMM_TABLE. At step 530, this value is compared to the configuration bits of the SIMM currently being evaluated. If they do not match, the routine proceeds to 532, where it increments PTR by 3, thus pointing to the next entry in SIMM_TABLE. If, at step 534, PTR has not reached the end of SIMM_TABLE, the routine proceeds again to step 528 to test the next table entry value against the current configuration bits.

If, however, at step 534 the end of the SIMM_TABLE has been reached, then no match has been found between the SIMM's configuration bits and a table entry. Therefore, the routine proceeds to step 536 where it sets the that SIMM's speed variable to slowest possible value, in this case being 80 nanoseconds. The routine then returns to step 538.

If, at step 530, ENTRY does equal the current SIMM's configuration bits, the routine proceeds to step 540 where it compares the value pointed to by PTR plus 1, which will be the associated SIMM size with that configuration bit pattern, with the stored SIMM_SIZE. If there is not a match, the routine proceeds to 532.

Otherwise, a match has been found in the SIMM_TABLE, and the speed for this SIMM is set to the value pointed to at PTR plus 2 at step 542. If this value is 1, that indicates an 80-nanosecond SIMM; if this value is 0, that indicates a 60-nanosecond SIMM. Of course, more bits could be used to allow for a greater number of SIMM speeds. In this embodiment, however, the greatest performance gain was found to occur between 80 and 60 nanoseconds, as it allows the elimination of the clock cycles as will be seen.

Proceeding to step 544, if SIMM_CNT is less than 4, the routine proceeds to step 546, where SIMM_CNT is incremented and control returns to step 524, where the next SIMM of the four SIMMs in the system is tested. If SIMM_CNT has reached 4 at step 544, control proceeds to step 548, where a determination is made as to whether all four SIMMs are the same speed by comparing the values obtained from the table. If not, the routine proceeds to step 536, where it sets all SIMM speeds to the slowest speed. Otherwise, it simply returns at step 538.

It should be noted that this determination of SIMM speed is limited to one set of SIMMs. It could easily be adapted for multiple sets of SIMMs in a system. That is, four SIMMs set at one address location could run at 60 nanoseconds, and another group of four SIMMs could run at 80 nanoseconds. In this embodiment, there are only four SIMM slots, and they must all run at the same speed, as they provide 32 data bits each of the 128-bit data path MD.

Therefore, by determining the actual size of the SIMM, this, when used with the SIMM configuration bits, allows unambiguous, or at least relatively unambiguous, determination of the SIMM speed, so that the DDF 164 can be properly programmed with the speed value and differing speed SIMMs used to advantage.

Figure 8:
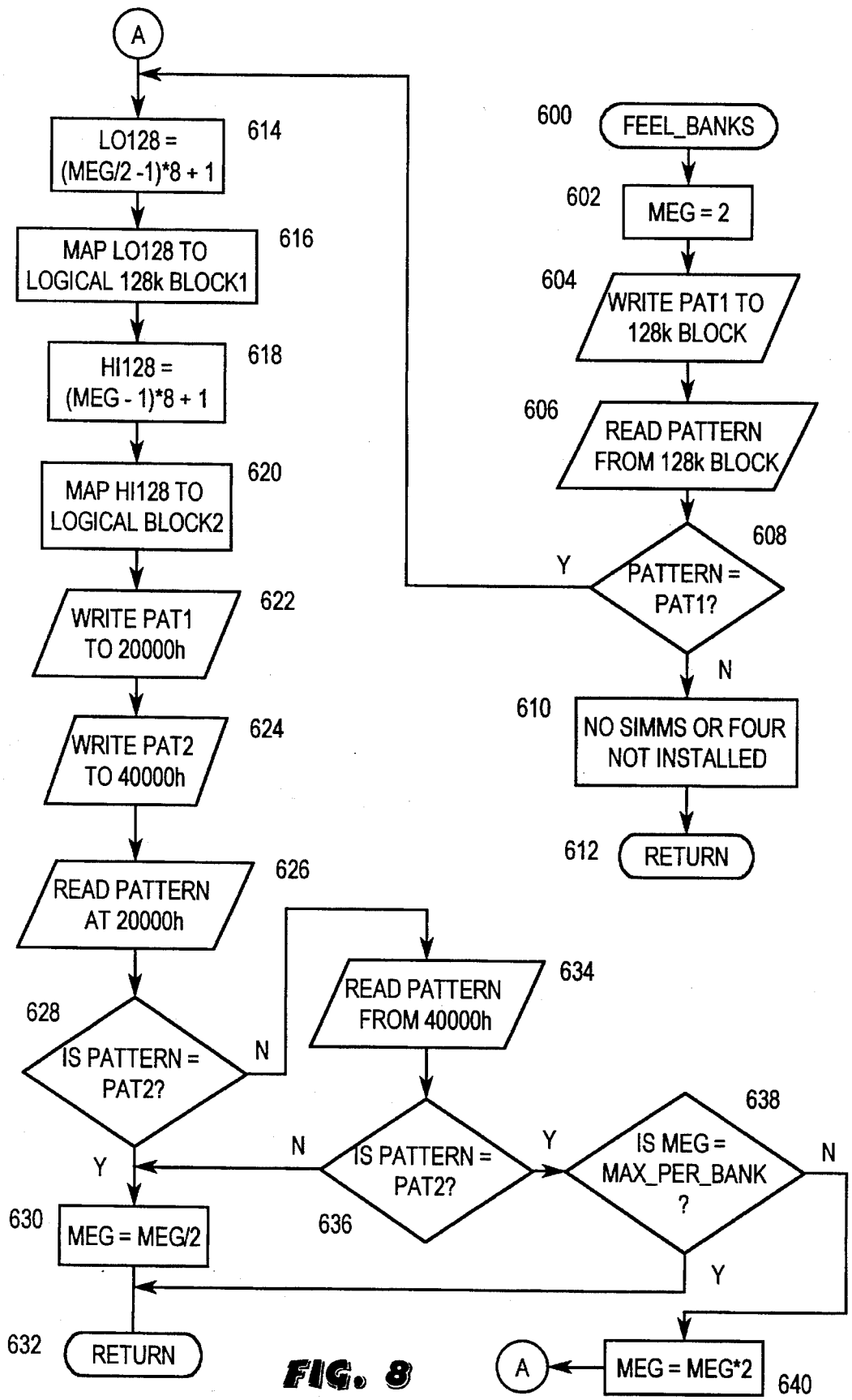
FIG. 8 is a flow chart illustration of a routine for determining the size of SIMMs installed in a computer system according to the invention.

FIG. 8 shows the routine FEEL_BANK 600. This routine is used to determine the size of a SIMM located in a particular bank. This is problematic, as some SIMMs alias to other memory locations. That is, if written to at one location, such a SIMM can be read from at another, mirror location. FEEL_BANK 600 handles this by using two test patterns, which it reads from two memory locations that would be otherwise aliased.

Proceeding to step 602, the variable MEG is set to 2. At step 604, the first pattern, PAT1, is written to the first 128 k block of the selected bank. PAT1 is arbitrary, and in the preferred embodiment is 2A5225A2h. Then at step 606, the pattern is read from that first 128k block, and at step 608, that pattern is compared to PAT1. If not equal, the routine proceeds to step 610, as no SIMMs, or at least all four, are not installed. From there, the routine returns at step 612.

If pattern does equal PAT1 at step 608, the routine proceeds to step 614, where the variable LOW128 is set to (MEG/2−1)×8+1. As MEG is initially 2, this value will thus be 1, and represents the 128 k block in which a memory and alias comparison is to be made.

At step 616, the physical memory located at the value indicated by LOW128 is then logically mapped to block 1 of logical memory. Proceeding to step 618, a value HIGH128 is set to (MEG−1)×8+1, which, in this case, is 9. Then, at step 620, the physical 128 k block in the currently selected bank is logically mapped to the second 128 k block of memory.

The values LOW128 and HIGH128 thus represent the second 128 k block (0 is first) in the first meg of this bank and the second meg of this bank. This mapping is done to determine if the second meg is an alias of the first meg, in which case the memory size has then been determined. If not an alias, and if the second meg does retain what was written to it, then there are at least 2 megabytes of memory. This will be determined below.

At 622, PAT1 is written to 20000h, which corresponds to the second 128 k logical block of memory, where the second 128 k physical block of memory is currently located. Then, at step 624, PAT2 is similarly written to logical location 40000h, which corresponds to the third logical 128 k block of memory, to which the tenth 128 k block of physical memory is mapped. PAT2 is distinct from PAT1, and in this embodiment is 4A5445A4h.

Then, at step 626, a pattern is read from location 20000h, and at step 628, is compared to PAT2, which was written to location 40000h at step 624. If the pattern does equal PAT2, that indicates that the memory at 40000h is an alias of the memory at location 20000h, or the second MEG of physical memory in this bank is an alias of the first MEG. In that case, it has been determined that the memory is half as large as the current value of MEG, which was 2, so at step 630, MEG is divided by 2, and that resulting value of MEG=1 is returned at step 632.

If, at step 628, the pattern does not match PAT2, control proceeds to step 634 where the pattern is read from location 40000h. This is done to determine if even though the two memory locations are not aliases, no memory in fact exists in this second meg.

At step 636, the pattern read in step 634 is compared to PAT2, and if not equal, we have again reached the end of the memory in this bank, so control proceeds to step 630. If the PAT2 does equal the pattern read at step 636, control proceeds to step 638, where MEG is compared to MAX_PER_BANK, which in this embodiment is 64. If they are equal, then we have reached the maximum allowable size of memory, so MEG is returned with the value of 64 at step 632.

If MEG has not reached a limit of MAX_PER_BANK at step 638, control passes to step 640, where MEG is doubled, and control then proceeds to step 614. The new values of LOW128 and HIGH128 generated at steps 614 and 618 will then become 9 and 25 to correspond to the second 128 k blocks of memory in the second and fourth Mb of memory. The pattern now emerges, first the first and second megs of memory were compared, now the second and the fourth, then will be compared the fourth and eighth, then the eighth and the sixteenth, then sixteenth and thirty-second, and then thirty-second and sixty-fourth. It is through this unique algorithm that the next values of LOW 128 and HIGH 128 are generated.

Finally, FIG. 9 shows a state machine used to a memory controller according to the invention. Although there are a number of other cycles which perform functions as described in the referenced application, of particular note in this case is the transition from states MR2 to states MR3, MR4, and MC1. These are RAS states based upon the processor clock, and as can be seen, when SPD60 is false, the state machine proceeds from step MR2, or RAS2, to step MR3. In certain other cases, this step is avoided when SPD60 is true. SPD60 is sent from the DDF 164 to the memory controller 156, and is enabled in response to a 128 k block of memory being accessed which is capable of 60 nanosecond access. It is noted that the SPD60 value is obtained from the DDF 164 on each memory access. Thus, in a computer system constructed according to the invention, one or more extra memory cycles are inserted on slower memory accesses, and are omitted on faster memory accesses. This thus allows improved performance when accessing faster memory, and decreased performance when accessing slower memory.

As will be clear, one could thus populate certain areas of memory with faster, albeit more expensive, 60 nanosecond RAM, and other less-used areas, such as extended memory, with slower RAM. This could of course be carried to a further extreme in having a greater number of RAM speeds, by providing more bits in the SPD60 signal. Then, more or less extra memory states could be inserted as shown in the memory state machine of FIG. 9.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. Method for determining the speed of a particular memory module that provides a fixed configuration code, where the speed is one of a plurality of available speeds, where the fixed configuration code could be one of at least a first standard or a second standard wherein different speed memory modules have the same configuration code, comprising the steps of:

(a) providing a table having entries of memory module configuration code, memory module size, and memory module speed that corresponds to said memory module configuration code and skid memory module size;

(b) determining the size of the particular memory module independent from the fixed configuration code of the particular memory module;

(c) reading the fixed configuration code of the particular memory module;

(d) attempting to locate the memory module configuration code entry in the table that corresponds to said fixed configuration code read from the particular memory module and that also corresponds to said determined size of the particular memory module;

(e) if an entry in the table was located at step (d), storing the corresponding memory module speed from the located entry as the speed of the particular memory module; and (f) if an entry in the table was not located at step (d), storing as the speed of the particular memory module the slowest of the plurality of available speeds.

2. The method of claim 1, wherein the fixed configuration code is a four bit configuration code.

3. The method of claim 1, wherein said memory module speed table entry is the slowest of at least two speeds that correspond to an identical memory module configuration code entry and memory module size entry.

4. A system for determining the speed of a particular memory module that provides a fixed configuration code, where the speed is one of a plurality of available speeds, where the fixed configuration code could be one of at least a first standard or a second standard wherein different speed memory modules have the same configuration code, the system comprising:

a processor for executing instructions;

a socket for insertion of the particular memory module, said socket coupled to said processor;

circuitry coupled to said socket adapted to read the fixed configuration code from the particular memory module and to provide said read fixed configuration code in response to instructions executed by said processor;

a table having entries of memory module configuration code, memory module size, and memory module speed that corresponds to the memory module configuration code and the memory module size, said table accessible by said processor;

means for determining the size of the particular memory module independent from the provided read fixed configuration code;

means for attempting to locate the memory module configuration code entry in the table that corresponds to said fixed configuration code read from the particular memory module and that also corresponds to the determined size of the particular memory module; and means for storing the corresponding memory module speed from the located entry as the speed of the particular memory module if an entry was located by said means for attempting to locate, and otherwise storing as the speed of the particular memory module the slowest of the plurality of available speeds.

5. The system of claim 4, wherein said circuitry is adapted to read a four bit fixed configuration code.

6. The system of claim 4, wherein said means for determining the size comprises:

means for writing to and reading from the particular memory module; and means for determining size of addressable memory locations in response to said means for writing to and reading from.

* * * * *

UNITED STATES PATENT AND TRADEMARK OFFICE
CERTIFICATE OF CORRECTION

PATENT NO.  : 5,509,138
DATED       : April 16, 1996
INVENTOR(S) : CASH, ET AL.

It is certified that error appears in the above-identified patent and that said Letters Patent is hereby corrected as shown below:

```
In column 15, line 33, please delete "skid" and insert in its
place --said--.
```

Signed and Sealed this

First Day of October, 1996

Attest:

BRUCE LEHMAN

Attesting Officer

Commissioner of Patents and Trademarks